(12) United States Patent
Brand et al.

(10) Patent No.: US 12,544,656 B2
(45) Date of Patent: Feb. 10, 2026

(54) SYSTEM AND METHOD FOR ALLOWING THE FREE ROTATIONAL SPIN IN A CONTROLLED MANNER OF GRIP SECTION OF A THUMBSTICK POTENTIOMETER

(71) Applicant: Satisfye, Inc., Fresno, CA (US)

(72) Inventors: Phillip Brand, Clovis, CA (US); Nathan Guzman, Clovis, CA (US)

(73) Assignee: Satisfye, Inc., Fresno, CA (US)

( * ) Notice: Subject to any disclaimer, the term of this patent is extended or adjusted under 35 U.S.C. 154(b) by 417 days.

(21) Appl. No.: 17/508,808

(22) Filed: Oct. 22, 2021

(65) Prior Publication Data

US 2022/0126196 A1 Apr. 28, 2022

Related U.S. Application Data

(60) Provisional application No. 63/105,079, filed on Oct. 23, 2020, provisional application No. 63/105,083, filed on Oct. 23, 2020.

(51) Int. Cl.
*A63F 13/24* (2014.01)
*G05G 9/047* (2006.01)
(Continued)

(52) U.S. Cl.
CPC ............ *A63F 13/24* (2014.09); *G05G 9/047* (2013.01); *G06F 3/0338* (2013.01); *G06F 3/039* (2013.01);
(Continued)

(58) Field of Classification Search
None
See application file for complete search history.

(56) References Cited

U.S. PATENT DOCUMENTS 5,384,914 A * 1/1995 Caveness ................. A42B 3/20
                                                          2/9
6,459,420 B1 * 10/2002 Harris ..................... A63F 13/24
                                                          D14/416
(Continued)

FOREIGN PATENT DOCUMENTS

JP       2008129859 A  *  6/2008

OTHER PUBLICATIONS

KontrolFreek, The Science Behind KontrolFreek® Performance Thumbsticks®, Apr. 7, 2020, https://www.youtube.com/watch?v=ad1WcVI-iN4 , time 0:00-2:05, p. 1 (Year: 2020).*
(Continued)

*Primary Examiner* — Tramar Harper
(74) *Attorney, Agent, or Firm* — Jeffrey C. Watson, Esq.; Grell & Watson Patent Attorneys LLC

(57) ABSTRACT

Systems and methods for alleviating problems encountered when using a conventional thumbstick by augmenting the thumbstick to enable swiveling (rotational movement) around the center or z axis of the thumbstick. In one embodiment, the swiveling motion is achieved by providing a swivel top mounted in a base that can itself be mounted on a post or a conventional thumbstick. In this embodiment, a rigid table having a split shaft and barbed retention clip is inserted into a receiving or retention hole in a connector base. A bearing surface and bearing raceway are provided to maintain the stability of the table while allowing it to rotate with respect to the base. The base may have legs that are configured to clip onto the top of a conventional thumbstick, or it may be configured to be mounted on a post of a three-axis potentiometer.

16 Claims, 10 Drawing Sheets

(51) Int. Cl.
*G06F 3/0338* (2013.01)
*G06F 3/039* (2013.01)

(52) U.S. Cl.
CPC ............. *A63F 2300/1043* (2013.01); *G05G 2009/04781* (2013.01)

(56) References Cited

U.S. PATENT DOCUMENTS

| | | | | |
|---|---|---|---|---|
| 6,535,104 | B1 * | 3/2003 | Koizumi | H01C 10/32 338/68 |
| 7,993,203 | B1 * | 8/2011 | Walker, II | A63F 13/98 345/161 |
| D655,350 | S * | 3/2012 | Taniguchi | D21/333 |
| D678,284 | S * | 3/2013 | Coulter | D14/412 |
| 8,784,208 | B2 * | 7/2014 | Borrel | A63F 13/98 463/38 |
| D762,780 | S * | 8/2016 | Mistry | D14/401 |
| D762,781 | S * | 8/2016 | Mistry | D14/401 |
| D762,782 | S * | 8/2016 | Walker, II | D14/401 |
| D766,374 | S * | 9/2016 | Kujawski | D14/401 |
| D868,163 | S * | 11/2019 | Mistry | D21/333 |
| D890,262 | S * | 7/2020 | Mistry | D21/333 |
| D900,226 | S * | 10/2020 | DeLille | D21/333 |
| D933,749 | S * | 10/2021 | Zhang | D21/333 |
| 11,376,496 | B1 * | 7/2022 | Brandt | A63F 13/24 |
| D970,626 | S * | 11/2022 | Liu | D21/333 |
| D994,779 | S * | 8/2023 | Liu | D21/333 |
| D1,025,216 | S * | 4/2024 | Zhu | D14/218 |
| 2002/0036622 | A1 * | 3/2002 | Jaeger | G06F 3/0433 345/173 |
| 2005/0168354 | A1 * | 8/2005 | McVicar | G06F 3/0338 341/20 |
| 2006/0003840 | A1 * | 1/2006 | Bailey | A63F 13/24 463/36 |
| 2009/0239665 | A1 * | 9/2009 | Minuto | A63F 13/24 463/38 |
| 2010/0167825 | A1 * | 7/2010 | Sternberg | A63F 13/98 463/47 |
| 2017/0368452 | A1 * | 12/2017 | Tiffany | G06F 3/016 |
| 2019/0060746 | A1 * | 2/2019 | Ironmonger | A63F 13/24 |
| 2019/0302829 | A1 * | 10/2019 | Guerrero, Jr. | G06F 3/0362 |
| 2021/0157418 | A1 * | 5/2021 | Wei | H05K 5/0017 |

OTHER PUBLICATIONS

KontrolFreek, KontrolFreek FPS Freek Galaxy, Aug. 8, 2020, https://web.archive.org/web/20200808201053/https://www.kontrolfreek.com/products/fps-freek-galaxy , pp. 1-7 (Year: 2020).*

* cited by examiner

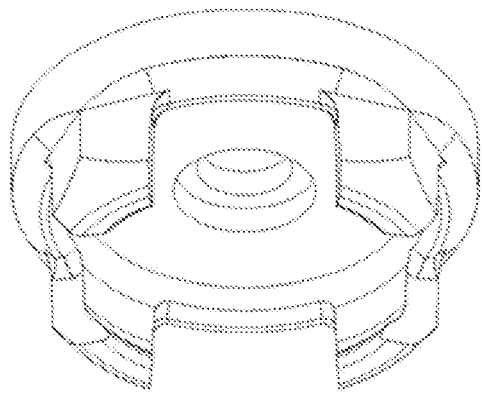
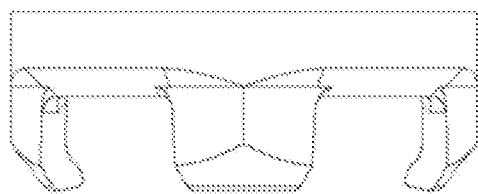
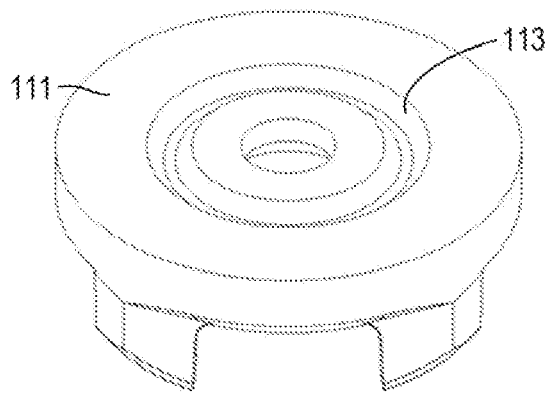
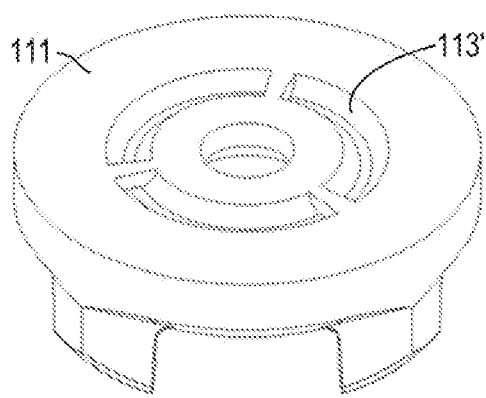
FIG. 3A
FIG. 3B

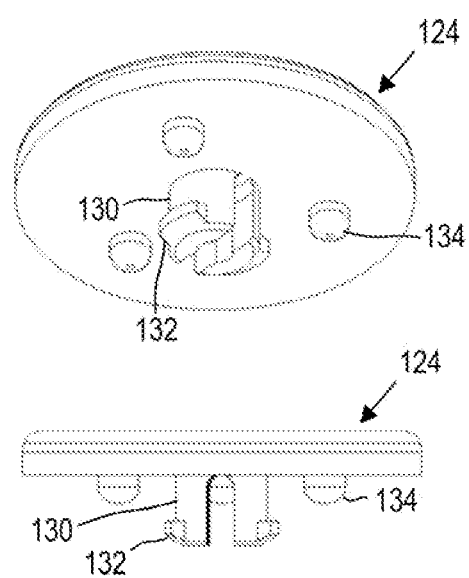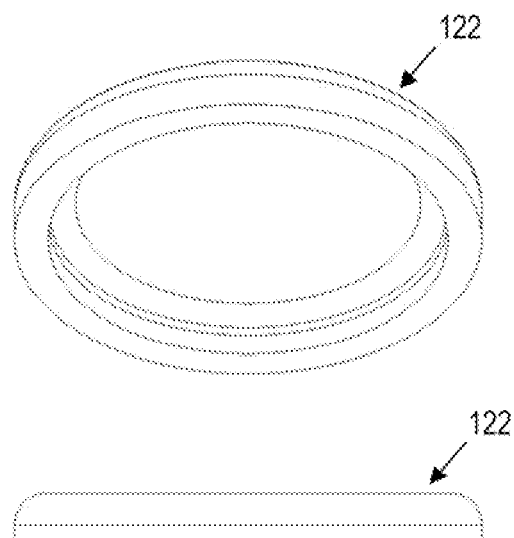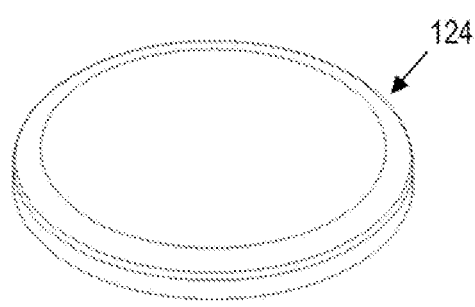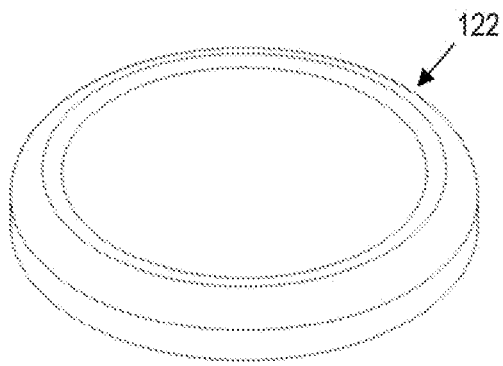
FIG. 4
FIG. 5

# SYSTEM AND METHOD FOR ALLOWING THE FREE ROTATIONAL SPIN IN A CONTROLLED MANNER OF GRIP SECTION OF A THUMBSTICK POTENTIOMETER

RELATED APPLICATIONS

This application claims priority under 35 U.S.C. § 119(e) to U.S. Provisional Application No. 63/105,083, entitled "System and Method for Allowing the Free Rotational Spin in a Controlled Manner of Grip Section of a Thumb-Stick Potentiometer", filed Oct. 23, 2020, and U.S. Provisional Application No. 63/105,079, entitled "System for Maximizing the Surface Contact Area and Ergonomic Potential Between the Human Thumb and a Grip Extension Device for Thumb-Stick Potentiometers", filed Oct. 23, 2020, which are fully incorporated herein by reference for all purposes.

TECHNICAL FIELD

This invention relates generally to control devices used in sync with analog or digital systems to control aspects of the hardware or software components that an analog or digital system is designed to influence, the controllers including but not limited to gaming controllers, UAV controllers, analog or digital servo motor controllers, and robotics controllers.

BACKGROUND

When most people think about games, they think about PlayStation, Xbox, etc. That does represent a significant portion of the market, but it's not market in total. A large part of the market is actually made up of PC gamers. PC gamers are using a proprietary console architecture to play games—they are using a personal computer that's running various sets of software to play video games. They may access videogames through, e.g., Steam or a third party aggregator.

There are several main marketplaces for video games were gamers can purchase them to run on their personal computer. Because of that, there are two main control types. One is what people imagine when they think of when they think about a conventional videogame controller. The other is usually a QWERTY keyboard and some sort of mouse or pointing device.

There are advantages and disadvantages to either one. A mouse and keyboard is not very ergonomic and it lends itself to its own kind of physical ailments. Some people that choose to use a controller instead of a QWERTY keyboard and mouse do so partially because of ergonomics, and also to avoid being bound to a desktop. In order to use a mouse and a keyboard they have to exist on a surface. Using a controller frees the gamer from being tied to the surface.

The downside to a controller is that certain digits and parts of the gamer's hand are required to be utilized in order to have a grip on the controller. When the gamer is using a keyboard, they have all five digits on each hand available to provide inputs. In a lot of modern games, the gamers can enable macros, which are essentially a sequence of control inputs that are compiled into a single button press. Thus, the gamer can press a key, and that key is actually a stack of actions. That stack of actions allows the gamer to expedite the process of running through sequences (e.g., duck, jump, zoom in, and then start shooting). This is a basic example, but there are tournament style games where a player may construct something, construct cover, build a hole to look through, grab a weapon, switch from weapons to tools, switch from tools to weapons, and/or take various other actions. The ability to do that quickly allows the gamer to be more successful with the game. Enabling macros to perform these actions is therefore very helpful to the gamer.

Regarding gaming controllers, the more advanced game controllers have begun to add several sets of buttons, where fingers traditionally didn't have them. Also, players have invented new ways of holding the controllers so that they can access buttons more easily and more quickly. Because of that, players have invented ways of interacting with the controller that the designers of the controllers have not considered. In other words, the controllers really were not designed to be used in this manner.

The use of embodiments of the inventions disclosed herein is not necessarily ubiquitous across the controller. In other words, a particular design for a thumbstick is not necessarily useful on both the right thumbstick and the left thumbstick. The two thumbsticks are each designed for specific purposes, and consequently are used in different ways. As a result, a design which helps the gamer to use a thumbstick in a particular way, or for a particular function may be useful on one of the thumbsticks, but not the other.

For example a design which allows the thumbstick to be more easily manipulated with an interphalangeal joint of the thumb may be useful on a right thumbstick of a controller (which is typically used for moving a character, aiming a weapon, etc.), but less useful on a left thumbstick (which is typically used for controlling a view of the area surrounding a character, rather than controlling the character itself). In some cases, the use of an embodiment which is designed for a particular one of the thumbsticks may, if used on the other thumbstick, actually impede the use of the thumbstick by the gamer.

SUMMARY

The present disclosure details systems, methods and products for enabling swiveling movement of the thumbpad of a thumbstick device. Embodiments of the present invention alleviate problems encountered when using a conventional thumbstick by augmenting the thumbstick to enable swiveling (rotational movement) around the center or z axis of the thumbstick. In one embodiment, the swiveling motion is achieved by providing a swivel top mounted in a base that can itself be mounted on a post or a conventional thumbstick. In this embodiment, a rigid table having a split shaft and barbed retention clip is inserted into a receiving or retention hole in a connector base. A bearing surface and bearing raceway are provided to maintain the stability of the table while allowing it to rotate with respect to the base. The base may have legs that are configured to clip onto the top of a conventional thumbstick, or it may be configured to be mounted on a post of a three-axis potentiometer.

The rotational movement of the present device allows for the interaction between the pad of the thumb and the grip of the thumbstick to maintain a high amount of surface contact for increased grip during movement between the x and y directions of the thumbstick, while allowing the thumb to maintain the most biomechanically advantageous position and thereby limit the amount of stress that is placed on the thumb and hand. This results in a smoother and more natural movement than is possible using a conventional thumbstick.

One embodiment comprises an adapter for a thumbstick control input device having a connector base and a swiveling platform. The connector base is adapted to connect the adapter to a thumbstick controller. The swiveling platform is connected to the connector base and is adapted to rotate with respect to the connector base. The adapter is configured to be mounted on the thumbstick control input device to allow a user's digit (e.g., thumb) an additional degree of freedom (i.e., to swivel with respect to the thumbstick control input device) and thereby improve contact while relieving stress on the digit.

In some embodiments, the adapter has a set of legs which extend downward from a body of the connector base, where the legs are adapted to removably clip the connector base onto a cap of an existing thumbstick. The connector base may comprise a polycarbonate plastic, where the body is substantially rigid and the legs are adapted to flex with respect to the body, enabling the legs to clip onto the cap of the existing thumbstick. Each of the legs may have a lower end which has a hooked tip that extends radially inward, so that the hooked tip extends underneath the cap of the existing thumbstick.

In some embodiments, the swiveling platform is configured to rotate 360 degrees with respect to the connector base. The swiveling platform may comprise a table that supports an elastomeric cushioning pad. The swiveling platform may also have a connecting post that extends downward from the table, into a receiving hole in the connector base, where the connecting post is adapted to rotate within the receiving hole. The post may comprise a split shaft having a lower end that has one or more barbs extending radially outward from the shaft, where the split shaft is adapted to flex and thereby enable the barbs to be inserted through the receiving hole in the connector base. The adapter may also have a recess at a lower end of the receiving hole which is adapted to receive the barbs, wherein when the split shaft is fully inserted into the receiving hole, the barbs are seated in the recess to retain the split shaft in the receiving hole.

In some embodiments, the connector base is a post-mounted base that has a recess which is adapted to receive an upward extending post of the thumbstick controller and to removably retain the connector base on the upward extending post.

In some embodiments, the adapter has a cushioning pad connected to an upper portion of the swiveling platform, where the cushioning pad comprises an elastomeric material which is adapted to cushion contact between a user's digit (e.g., thumb) and the swiveling platform. In some embodiments, a lower portion of the cushioning pad rests on the thumbpad support and an upper portion of the cushioning pad has an upward facing thumbrest surface, where the thumbrest surface has an outer ridge around a central depression, the height of the depression being less than the height of the outer ridge. The upward facing thumbrest surface, may alternatively have an outer ridge around the central depression, where the outer ridge is interrupted on one side by a notch surface. The notch surface may extend from the central depression to the outer periphery of the thumbrest surface, where the height of the notch surface is less than the height of the outer ridge. The notch surface may have an upward slope extending from the outer periphery of the thumbrest surface to an intermediate ridge and a downward slope extending from the intermediate ridge to the central depression, wherein the height of the intermediate ridge is greater than the height of the notch surface at the outer periphery of the thumbrest surface, greater than the height of the central depression, and less than the height of the outer ridge. The central depression may include an annular outer portion which is concave and a center portion which is convex and which is concentric with the annular outer portion.

An alternative embodiment may comprise thumbstick control input device having a thumbstick post and a cap which is integral to an upper end of the thumbstick post. The cap provides a connector base for a swiveling platform, where the swiveling platform is connected to the connector base and adapted to rotate with respect to the connector base. In some embodiments, the swiveling platform comprises a table which supports an elastomeric cushioning pad and which has a connecting post extending downward from the table. The connecting post extends into a receiving hole in the connector base and is adapted to rotate within the receiving hole. In some embodiments, the post is a split shaft having a lower end which includes one or more barbs extending radially outward from the split shaft, where the split shaft is adapted to flex and thereby enable the barbs to be inserted through the receiving hole in the connector base. The receiving hole has a recess at a lower end which is adapted to receive the barbs, so that when the split shaft is fully inserted into the receiving hole, the barbs are seated in the recess to retain the shaft in the receiving hole.

Another alternative embodiment comprises a control input device including a hand controller for a computer system, where the hand controller has a thumbstick. The thumbstick has a lower end which is pivotally connected to a three-axis potentiometer, and has an upper end which is adapted to be movable by contact with a user's digit (e.g., thumb). The upper end of the thumbstick has a thumbpad support and a cushioning pad connected to the thumbpad support. The thumbpad support has a connector base and a swiveling platform, where the swiveling platform is connected to the connector base and is configured to swivel with respect to the connector base. The swiveling platform may have a table that supports an elastomeric cushioning pad, as well as a connecting post that extends downward from the table. The connecting post extends into a receiving hole in the connector base and is adapted to rotate within the receiving hole. The post may be a split shaft having a lower end which includes one or more barbs extending radially outward from the split shaft. The split shaft is adapted to flex and thereby enable the barbs to be inserted through the receiving hole in the connector base. The receiving hole has a recess at a lower end which is adapted to receive the barbs, so that when the split shaft is fully inserted into the receiving hole, the barbs are seated in the recess to retain the split shaft in the receiving hole.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIGS. 3A and 3B are diagrams illustrating a connector base of a swiveling thumbpad device in accordance with some embodiments.

FIG. 4 is a diagrams illustrating a rigid table portion of a swiveling thumbpad device in accordance with some embodiments.

FIG. 5 is a diagrams illustrating a cushioned pad portion of a swiveling thumbpad device in accordance with some embodiments.

DETAILED DESCRIPTION

Figure 1A:
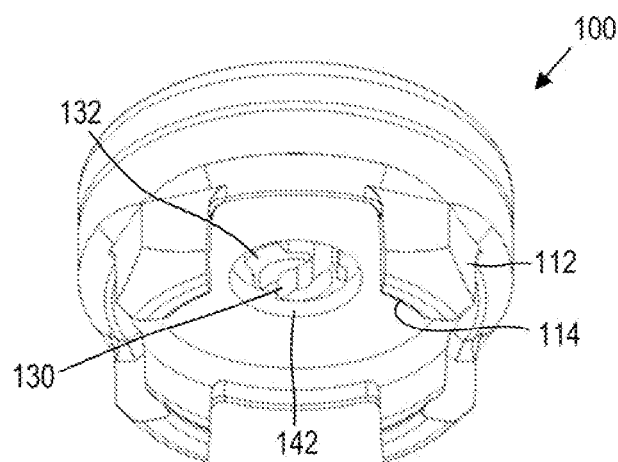
FIGS. 1A-1C are diagrams illustrating a swiveling thumbpad configured to be clipped onto the top of an OEM thumbstick in accordance with some embodiments.

As noted above, Modern controllers are equipped with a set of 3-Dimensional thumbstick potentiometers used to input control commands into a system. During extended and vigorous use of the thumbsticks, the user can experience soreness, fatigue and pain caused by the tension and stress placed upon the different ligaments, tissues, joints and muscles of the thumb and hand. The invention addresses these issues by creating a 4th axis of rotational movement around the center of the thumbstick. The added 4th axis allows the thumbstick to adjust to the thumb's position and provide a more biomechanically advantageous interaction between the thumb and the thumbstick.

There are a few products on the market that seek to solve the ergonomic issues with current thumbstick designs. These solutions seek to be effective by either augmenting the grip capabilities and leverage features of the thumbstick by attaching to the top of the thumbstick or by attaching to the potentiometers as a direct replacement for the original equipment manufacturer (OEM) thumbstick, but these devices only work within the 3 degrees of movement that are enabled by the OEM thumbstick. Because the previously mentioned solutions do not include the addition of the 4th rotational axis of movement, they do little to address the ergonomic issues encountered during extended use due to the fact that they are still confined to the limits that are inherit to the nature of the relationship between the 2 main axes of movement of the thumbsticks (the x and y-axis) and the anatomy of the human hand and thumb, and the orientation of the hand on the controller.

Embodiments disclosed herein address the ergonomic issues encountered when using the thumbstick by augmenting the thumbstick to add a 4th dimension of movement, specifically a rotational movement around the center axis (z axis) of the thumbstick.

This rotational movement allows for the interaction between the pad of the thumb and the grip of the thumbstick to maintain a high amount of surface contact for increased grip during movement between the x and y directions of the thumbstick especially around the perimeter of the thumbstick's area of potential movement, while allowing the thumb to maintain the most biomechanically advantageous position to limit the amount of stress that is placed on the thumb and hand. In essence, because of this added 4th dimension of movement a much smoother and more natural feeling movement is allowed when using these embodiments.

Embodiments of the present invention can provide the 4th dimension of movement (the rotational movement around the z-axis of the thumbstick) in a number of ways. In some embodiments, the extra axis of motion is accomplished by providing a swivel top mounted in a base that can be mounted on a post or OEM thumbstick. These embodiments may utilize three features: a bearing surface and bearing raceway; a split shank retention clip and retention hole; and a center pivoting shaft and a pivot shaft receiving hole.

These features are implemented across two different parts. The first part is the connector base of a two-part swiveling thumbpad assembly. It can, for example, have a four-pronged base designed to clip over the top of an existing thumbpad or have a post as its base with a recessed hole on the bottom designed to receive and slip over the control post of a 3-axis potentiometer (e.g., an OEM thumbstick). While examples of these two alternatives are provided in this disclosure, other alternatives may be apparent to those of skill in the art.

The second part is a swiveling platform that forms the upper part of the two-part thumbpad assembly. The swiveling platform has a thermoplastic elastomer (TPE) over-mold on the upper section of the part to serve as a grip surface, and the bottom section of the part is exposed polycarbonate plastic that will interact with the upper plane of the connector base.

In one embodiment, the connector base and the swiveling platform are made of polycarbonate plastic. Polycarbonate has three material features that may facilitate lend to the function of the device: a low coefficient of friction ($\mu0.31$); a high Shore Hardness (D80); and a high melt temperature (288-316° C.).

The low friction coefficient of polycarbonate will allow the bearing surfaces of the connector base and the swiveling platform to slip across each other smoothly and with little resistance and friction. The high Rockwell rating of polycarbonate will enable the upper and lower parts of the invention to do well at resisting material breakdown caused by any friction and abrasion encountered during use. The high melting point of polycarbonate will allow the material to have a Thermoplastic elastomer over-molded onto it with little to no deformation.

The following is a more detailed description of several features related to the connector base's function. The connector base first functions as a base for the swivel. The connector base is a truncated cylinder where the upper and lower portions of the cylinder have distinct features. The lower portion of the cylinder can have a number of alternative designs. Two variations are described herein for two primary use cases. The first of these variations consists of a set of 4 prongs set around the periphery of the cylinder (e.g., 90 degrees from each other, so that they can clip around the existing thumbpad's outer contours). The second of the variations consists of a post that extends down from the lower portion of the cylinder. The post has a hemispherical shroud where the hemisphere's apex begins directly beneath the point where the post makes contact with the bottom of the lower portion and continues down and away from the post. The post has a hole at the bottom of it specifically designed to receive the control post that protrudes up from the 3-axis potentiometer with a snug friction fit.

The connector base also has a bearing feature. In this embodiment, the connector base's upper portion is smooth with three features designed to facilitate low friction rotational motion between it and the swiveling platform. These features act as bearing raceways to receive the swiveling platform's features that function as bearing surfaces. Each bearing raceway is a recessed section extruded down into the upper plane of the connector base. The raceways run concentrically around the center of the top plane and are separated by a wall so as not to conjoin them. Each raceway's bottom has a fillet running along both long edges so that the raceway is round.

The connector base also provides a retention hole feature. The connector base has a hole in the center of its cylindrical body. This hole starts at the cylinder's top plane and runs straight down at a 90-degree angle, ending at the cylinder's lower plane. This retention hole is sized so that the split shank retention clip of the swiveling platform can slip through it. The lower plane of the cylinder has a circular recessed area around the retention hole so that the barbs of the split shank retention clip can exit the lower plane of the cylinder and lock the connector base and B together.

The connector base's retention hole serves as a receiving hole for the pivoting shaft of the swiveling platform. The hole is sized so that the pivoting shaft fits loosely with minimal play between the two parts so that the rotational motion of the two parts is not inhibited.

The following is a more detailed description of the features related to the swiveling platform's function. The swiveling platform is a truncated cylinder where the upper and lower planes of the cylinder have distinct features. The lower plane of the cylinder has two distinct feature sets. The first is a set of three small cylinders protruding from the lower plane where the ends of the cylinders have been rounded to make them hemispherical. The second is a split shank retention clip that doubles as a center pivoting shaft. The upper plane of the swiveling platform is concave so that there is a shallow bowl on the upper plane.

The swiveling platform has a bearing feature. As noted above, the swiveling platform has three small cylinders protruding from its lower plane, with the tops of the cylinders rounded to make them hemispherical. The rounded cylindrical protrusions are located at positions which are equidistant from the axis of the cylinder. In one embodiment, these protrusions are spaced 120 degrees apart around the lower plane. In some embodiments, the protrusions are positioned so that each protrusion will index into bearing raceways located on the connector base when the two parts are joined. The bearing raceways may consist of separate individual raceways corresponding to each of the protrusions, or a single, continuous raceway may be used. The single, continuous raceway has the advantage of allowing full 360-degree rotation of the swiveling platform with respect to the connector base, where the separate, individual raceways will restrict rotation to approximately 120 degrees.

The swiveling platform provides a split shank retention clip feature. The swiveling platform has a cylindrical center shaft protruding from the center of the lower plane. It has a split end bisecting the shaft most of the way down its length. This split allows the two sides of the shaft to flex in towards the center of the shaft while it is inserted into the receiving hole of the connector base and will spring back to its original position after fully inserted into the receiving hole. The retention clip also has a barb located on each half of the retention clip so that the flat section of the bard that is parallel to the lower plane is facing towards the lower plane, and the chamfered section of the barb is facing away from the lower plane.

The swiveling platform also provides a pivot shaft. The split shank retention clip of the swiveling platform doubles as a central pivoting post for the swiveling platform. The shaft is sized so that it fits loosely, but with minimal play between the two parts, so that the rotational motion of the two parts is not inhibited.

The swivel device is designed primarily to be used on the left thumbstick. In most games, the right thumbstick is essentially used to control the player, or the character. In other words, it is used to rotate the character writer left in the character forward or backward. The left thumbstick is primarily used to move the camera. In other words, it moves the third person point of view around the character and allows the camera to be rotated 360° around the character.

To some, it may not appear that there is much difference between the operation of the right and left thumbsticks, but the player has to be more agile with the right thumbstick because if the gamer has to aim or jump or strafe in a particular direction, the speed with which that is done and the angle of that action is controlled by the right thumbstick. That is why many gamers will increase the height of the thumbstick. This increases the fine control of the movement and effectively increase the resolution of the control movement. On the left, this high resolution typically is not needed. The problem is that movement of the camera typically involves moving the thumbstick between the limits of the thumbstick's movement.

As the thumbstick is moved between these limits, it causes the CMC (carpal-metacarpal) interphalangeal joint to move back and forth with the top of the thumbstick. While the position of the top of the thumbstick pivots with respect to the base of the thumb, the thumbpad at the top of the thumbstick in a conventional (non-swiveling) thumbpad does not pivot. This causes the tip of the thumb to move without rotating with respect to the controller, but effectively changing the orientation of the tip of the thumb with respect to the base of the thumb. Specifically, the tip of the thumb is slightly rotated and twisted with respect to the base of the thumb (which could be considered "roll" and "y'all" if the tip of the thumb is facing forward). This causes stresses in the thumb, particularly the portion of the thumb around the cuticle area.

The swivel design of the embodiments disclosed herein allows the tip of the thumb to rotate with respect to the top of the thumbstick, and this small amount of play allows the thumb to move in a more biomechanically correct motion in which the thumb would naturally move in the absence of stresses caused by the thumbstick. By reducing stresses on the thumb in this manner the player's hand can move more freely and more quickly. This freedom and speed of motion enables the player to more effectively operate the controller, and to do so with less fatigue.

Exemplary embodiments are described below. these embodiments are intended to be illustrative of the invention rather than limiting.

Figure 1B:
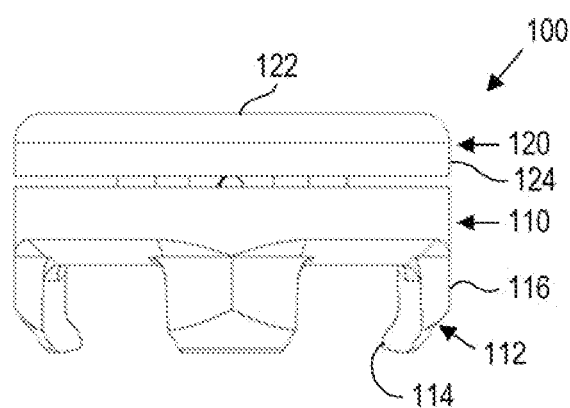
Figure 1C:
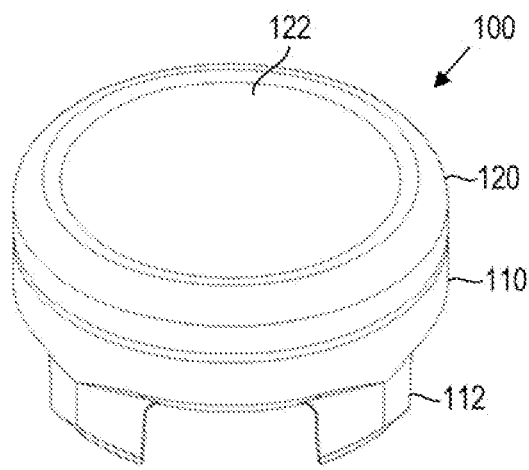

Referring to FIGS. 1A-1C, a set of diagrams are shown to illustrate an embodiment of a swiveling thumbpad configured to be clipped onto the top of an OEM thumbstick in accordance with some embodiments. FIG. 1A is a lower perspective view of the swiveling thumbpad device, FIG. 1B is a side view of the device, and FIG. 1C is a lower perspective view of the device.

Device 100 has a connector base 110 and a swiveling platform 120 which is rotatably connected to the connector base. In this embodiment, swiveling platform 120 has a substantially rigid table 124 with a cushioned pad 122 secured to the upper surface of the rigid table. Cushioned pad 122 may also be referred to herein as an "over mold" because it may be molded over the rigid table 124. Rigid table 124 has a central post 130 which extends downward (toward the bottom of the figures) through a central receiving hole in connector base 110. Central post 130 is sized to fit closely within the receiving hole so that the post allowed to freely rotate within the receiving hole, while minimizing "play" (lateral movement of the post within the receiving hole).

In this embodiment, central post 130 is a split post having a set of barbs 132 are provided at the lower end of the post. When central post 130 is being inserted into the receiving hole, the two sides of the split post flex inward slightly to allow the barbs to fit within the receiving hole. When central post 130 is fully inserted into the receiving hole, the two sides of the post flex outward so that barbs 132 move into a recess 142 at the lower end of the receiving hole. In this position, barbs 132 retain central post 130 within the receiving hole and thereby hold swiveling platform 120 in position against connector base 110, while still allowing the swiveling platform to rotate with respect to the connector base.

Connector base 110 in this embodiment has four clip-on legs (e.g., 112) which extend downward from the bottom of the connector base. The clip-on legs are positioned 90° apart from each other around the periphery of the connector base. Each leg has a slightly hooked tip 114 which extends radially inward (toward the axis of rotation of the device). When the swiveling thumbpad device is installed on the upper portion of the OEM thumbstick, the hooked tip of each leg extends slightly under the upper platform of the OEM thumbstick to hold the swiveling thumbpad device onto the OEM thumbstick. The clip-on leg may have a ridge 116 at the center of the leg to provide additional strength to the leg and stiffen the leg as it flexes when the swiveling thumbpad device is installed on the OEM thumbstick.

Each leg in this embodiment has a width corresponding to an angular extent of approximately 35-40 degrees, with an open space of approximately 50-55 degrees between adjacent legs. The with each leg may vary from embodiment to embodiment, and is designed to be sufficiently wide to provide sufficient strength, as well as to prevent the swiveling thumbpad device from popping off the OEM thumbstick when a user moves the thumbpad (and the thumbstick) laterally. In some embodiments, the underside of connector base 110 is textured to reduce slippage between the connector base and the OEM thumbstick when the device is installed on the thumbstick.

Figure 2:
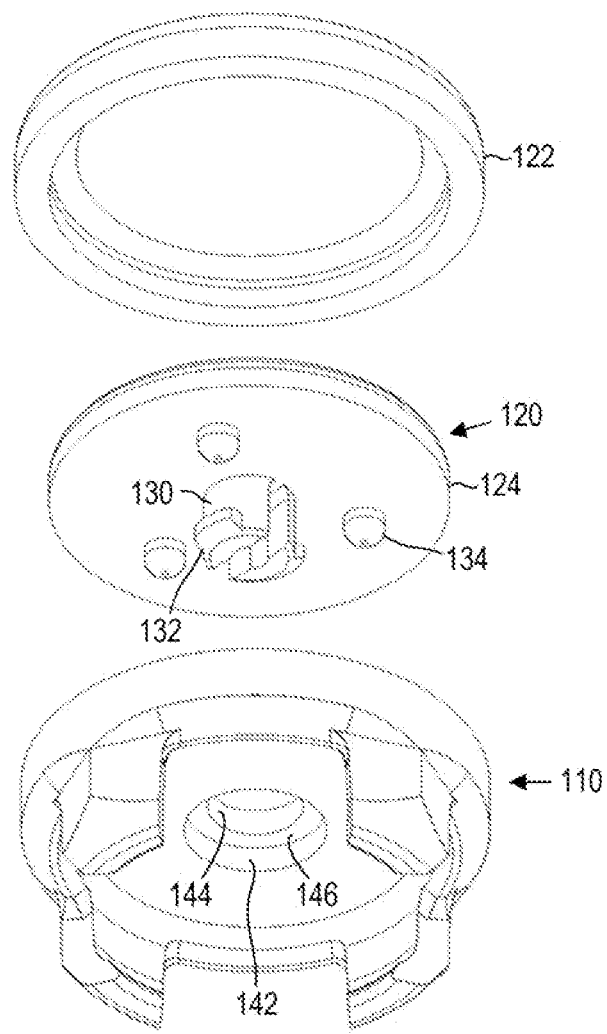
FIG. 2 is a diagram illustrating an exploded view of the swiveling thumbpad device of FIG. 1.

Referring to FIG. 2, an exploded view of the swiveling thumbpad device of FIG. 1 is shown. This figure shows the separate components of the device, including connector base 110, the rigid table portion 124 of swiveling platform 120, and the cushioned pad (over mold) 122. Each of these components is shown separately from several views in FIGS. 3-5.

In this figure, the split central post 130 which extends downward from rigid table 124 is more clearly visible. Barbs 132 at the lower end of split post 130 are also more clearly visible. FIG. 2 also shows the receiving hole 144 which extends through the center of connector base 110. As well as the recess 142 at the lower end of the receiving hole the recess forms a lateral surface or shelf 146 which contacts barbs 132 to prevent or impedes central post 130 from being removed from the receiving hole once the post is fully inserted into the hole.

It can also be seen in FIG. 2 that there are three protrusions (e.g., 134) which extend downward from the underside of rigid table 124. As noted above, these protrusions serve as bearings which contact raceways in the upper surface of connector base 110. Protrusions 134 are configured to maintain contact against the raceway surfaces to stabilize the rigid table against the top of the connector base, while also sliding easily against the raceways to allow the swiveling platform to rotate freely with respect to the connector base.

Referring to FIG. 3A, connector base 110 is shown from several views, including a lower perspective view, a side view, and an upper perspective view. In the upper perspective view at the bottom of the figure, it can be seen that the upper surface 111 of connector base 110 as a raceway 113 which is coaxial with receiving hole 144. Raceway 113 is slightly recessed into upper surface 111, and is positioned at a distance radially from the center of receiving hole 144 which is the same as the distance at which protrusions 134 are spaced from the center of central post 130 of rigid table 124 of swiveling platform 120, so that the protrusions will be positioned within the raceway when the swiveling platform is seated on the connector base.

In one alternative embodiment, rather than having a single raceway which extends 360 degrees around receiving hole 144, separate raceways may be provided corresponding to each of the protrusions 134. This is illustrated in FIG. 3B. It can be seen that there are three raceways (e.g., 113'), each of which corresponds to one of protrusions 134. In this embodiment, the separate raceways will allow the swiveling platform to rotate only by approximately 120 degrees instead of the full 360 degrees.

Referring to FIG. 4, table 124 is shown from several views, including a lower perspective view, a side view, and an upper perspective view. In the lower perspective view (at the top of the figure), split connector post 130 can be seen extending downward from the underside of table 124. Barbs 132 can be seen at the lower end of split post 130. Protrusions 134 can also be seen extending downward from the underside of table 124.

Referring to FIG. 5, cushioned pad 122 is shown from several views, including a lower perspective view, a side view, and an upper perspective view. The underside of cushioned pad 122 is bonded or otherwise secured to the upper surface of table 124. In some embodiments, cushioned pad 122 may be molded onto table 124. The upper surface of cushioned pad 122 may be molded into a variety of different shapes to provide the desired contact with the user's thumb (or other digit) on top of the thumbstick. Several possible shapes are illustrated in FIGS. 6A-6C.

Figure 6A:
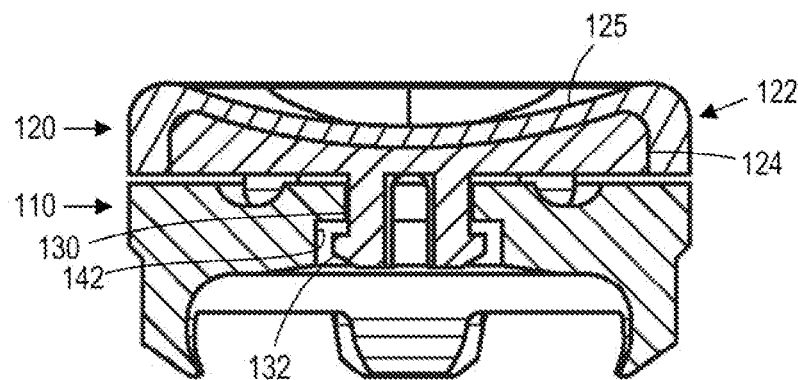
FIGS. 6A-6C are diagrams illustrating exemplary cross-sectional shapes of the swiveling thumbpad in accordance with some embodiments.
Figure 6B:
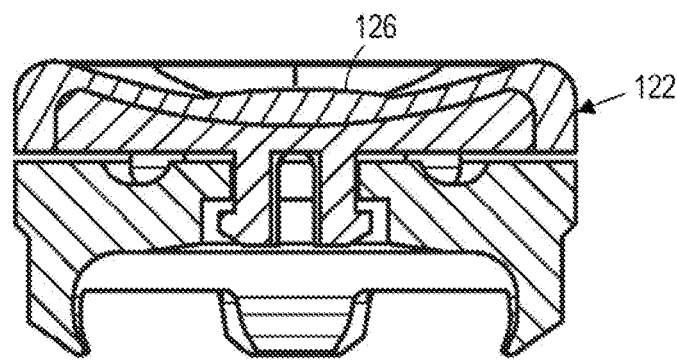
Figure 6C:
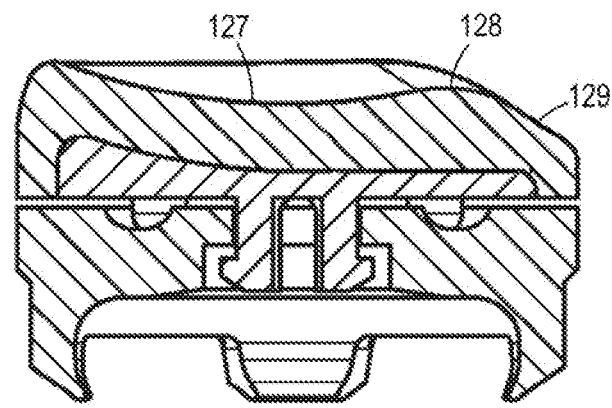

FIGS. 6A-6C are diagrams illustrating exemplary cross-sectional shapes of the swiveling thumbpad in accordance with some embodiments. FIG. 6A is an embodiment that has a relatively simple concave upper surface. FIG. 6B is an embodiment that has a generally concave upper surface with a central dimple. FIG. 6C is an embodiment that has a generally concave upper surface with a notch on one side.

Figure 10A:
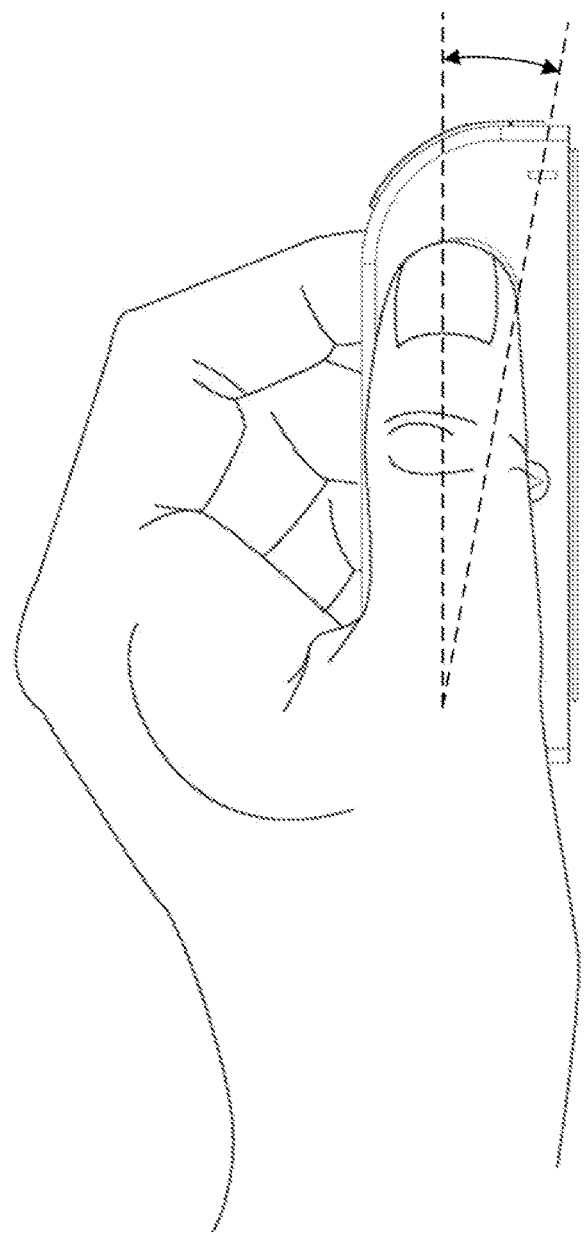
FIGS. 10A-10B are diagrams illustrating the movement of a user's thumb in the operation of a controller device having a swiveling thumbpad device in accordance with some embodiments.
Figure 10B:
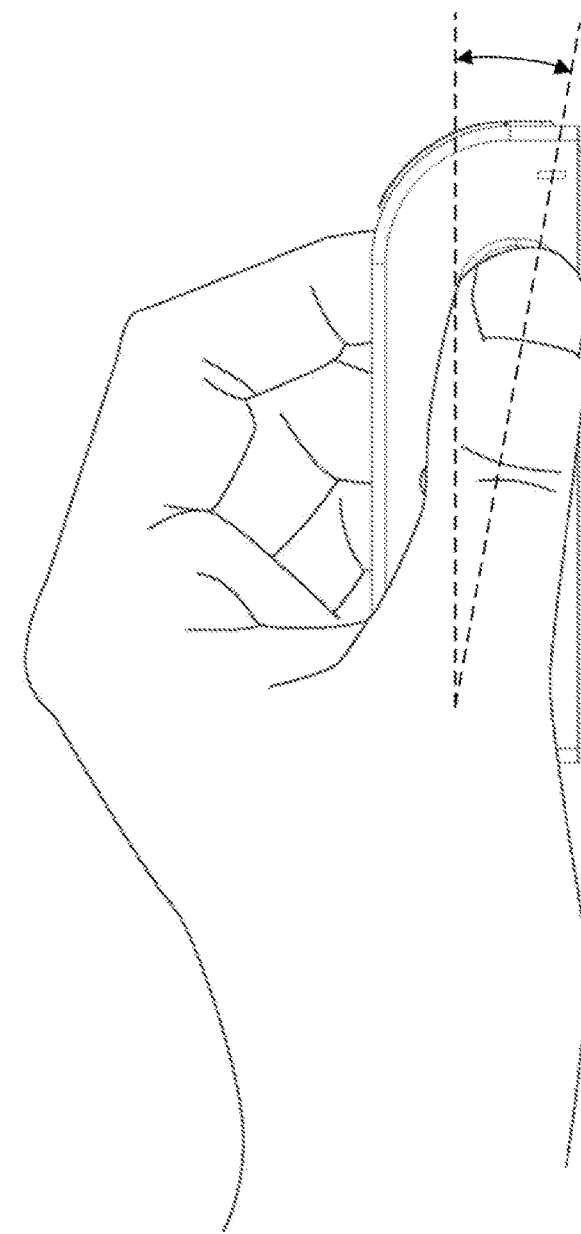

Referring to FIG. 6A, swiveling platform 120 is mounted on connector base 110. Split post 130 extends through the central hole in connector base 110 so that barbs 132 extend into recess 142, holding the swiveling platform in place on the connector base. The upper surface of rigid table 124 is slightly concave, and cushioned pad 122 is molded onto the upper surface of the rigid table. The upper surface 125 of cushioned pad 122 is likewise concave, forming a slight recess in which the user's thumb will rest. the upper surface of cushioned pad 122 is generally rotationally symmetric. The positioning of the user's thumb is illustrated in FIGS. 10A and 10B. Cushioned pad 122 may be formed using a material such as a TPE to provide a cushioned surface for the user's thumb.

Referring to FIG. 6B, a swiveling platform 120 is again mounted on a connector base 110. The rigid platform structure and connector base are identical to that of the embodiment shown in FIG. 6A, but the upper surface of cushioned pad 122 has a different shape. In this embodiment, the upper surface of the cushioned pad is again rotationally symmetric. The outer, annular portion of the upper surface is generally concave, but there is a slight bump 126 in the center of the cushioned pad. Bump 126 may reduce the slippage between the user's thumb and the cushioned pad when the user moves their thumb laterally (e.g., to the left or right in the figure). The cushioned pad in this embodiment may be formed using techniques and materials similar to those used in the embodiment of FIG. 6A.

Referring to FIG. 6C, another alternative embodiment of the cushioned pad of the device is shown. The structure of the rigid platform and connector base are the same as in FIGS. 6A and 6B. The upper surface of the cushioned pad has a raised outer perimeter with a generally concave portion 127. On one side (the right side in the figure), rather than rising to the same height as the outer perimeter of the cushioned pad, the upper surface rises only slightly at a ridge 128 between the center and the perimeter, and then has a downward sloping surface 129. Thus, overall, the perimeter of the cushioned pad has a "notch" at ridge 128. The user's thumb can be positioned in this notch to relieve some pressure on the thumb where it crosses the outer ridge of the cushioned pad. A slight rise (128) may be desirable to improve the grip of the user's thumb when the thumbstick is moved toward the notch (i.e., to the right in the figure).

Figure 7A:
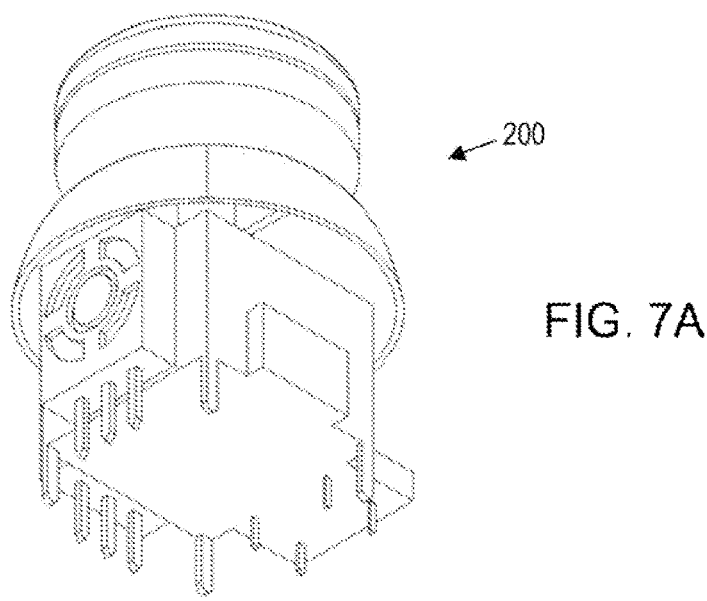
FIGS. 7A-7C are diagrams illustrating a control device including a three-axis potentiometer and a swiveling thumbpad in accordance with some embodiments.
Figure 7B:
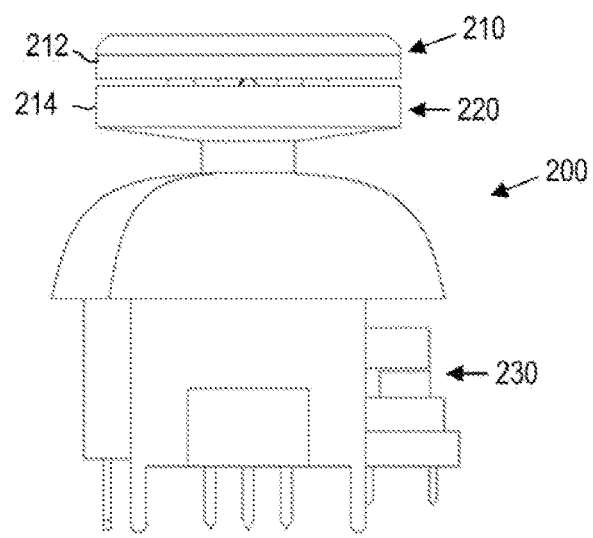
Figure 7C:
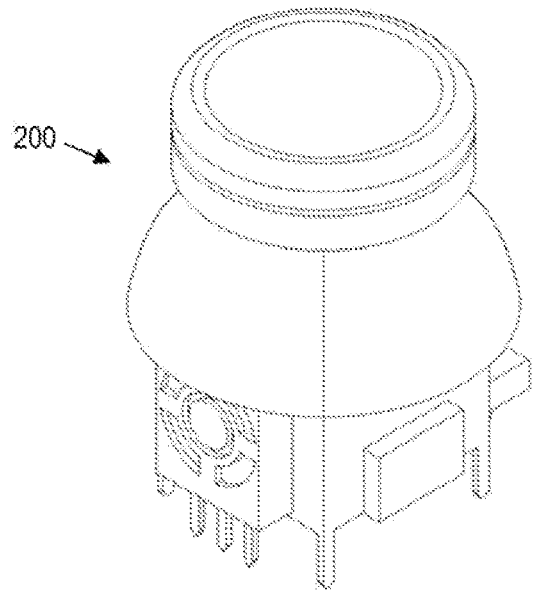
Figures 8A, 8B:
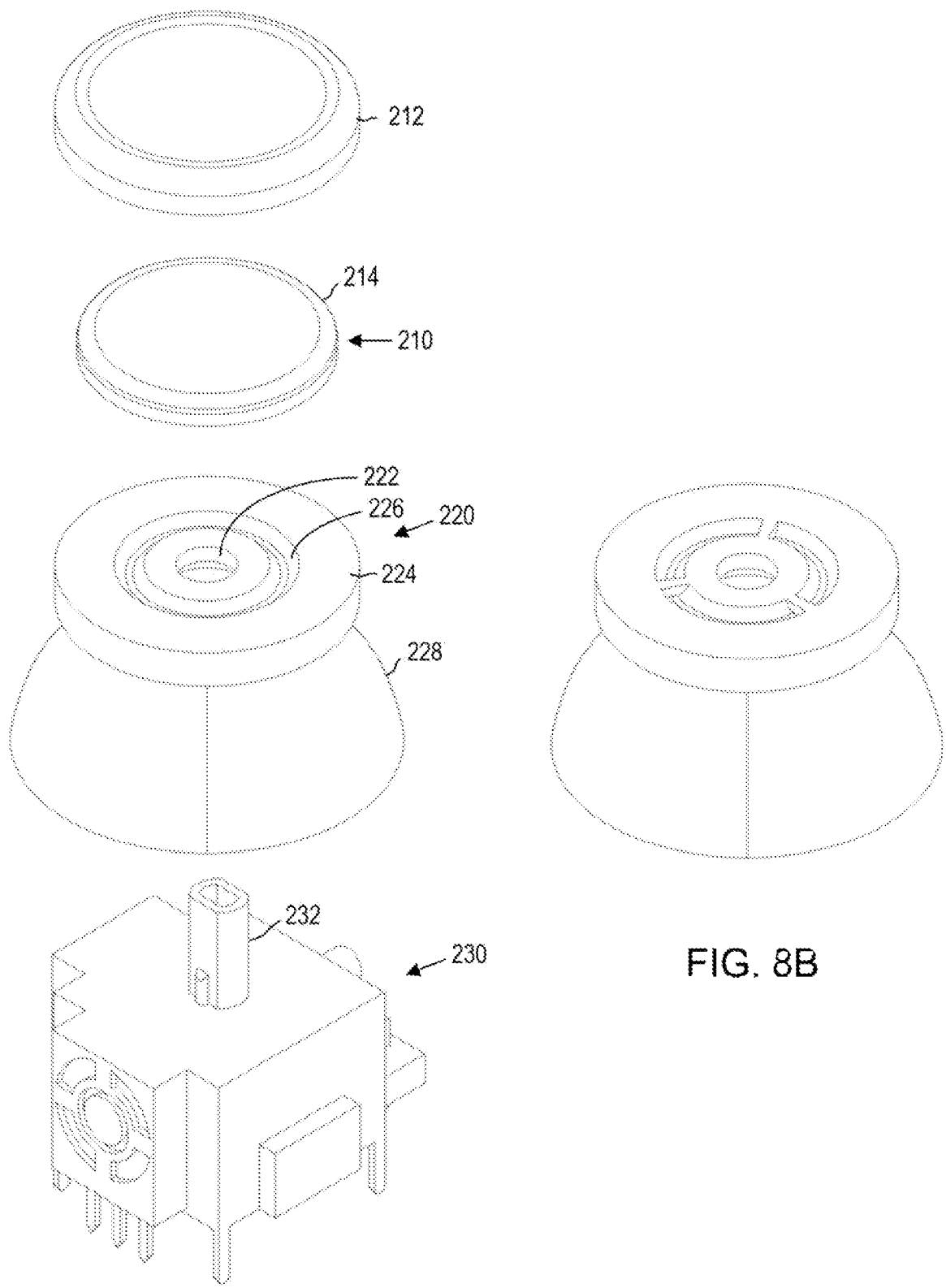
FIGS. 8A-8B are diagrams illustrating an exploded view of the swiveling thumbpad device of FIG. 7.

Referring to FIGS. 7A-7C, a set of diagrams are shown to illustrate a control device including a three-axis potentiometer and a swiveling thumbpad in accordance with an alternative embodiment. FIG. 7A is a lower perspective view of the device, FIG. 7B is a side view of the device, and FIG. 7C is an upper perspective view of the device. Rather than using a clip-on connector base to attach a swiveling thumbpad to an OEM thumbstick, device 200 uses a swiveling platform 210 that is attached to a post-mounted base 220. An exploded view of this embodiment is depicted in FIG. 8A.

Swiveling platform 210 may be configured in the same manner as swiveling platform 120 as described above. The means for attaching the swiveling platform to the base may vary from embodiment to embodiment, and the cushioned pad 212 secured to the top of the rigid table 214 may have any suitable shape (see, e.g., FIGS. 6A-6C above) and use any suitable materials.

In one embodiment, swiveling platform 210 is has a central split post that extends downward through a receiving hole 222 of post-mounted base 220. The central split post of the swiveling platform has barbs that are used to secure the platform to the base in the same manner as shown in the embodiment of FIG. 1 while allowing the platform to swivel.

Post-mounted base 220 has an upper surface 224 with a Raceway 226 that is configured to receive protrusions extending downward from the underside of rigid table 214. Raceway 226 may be a single raceway that extends 360° around the receiving hole, or it may be segmented to provide a more limited rotation. An example of the segmented raceway is illustrated in FIG. 8B.

Post-mounted base 220 has a central post that extends downward within hemispherical shroud 228 and is designed to be mounted over a control post 232 that protrudes upward from a three-axis potentiometer 230. Shroud 228 covers the three-axis potentiometer but allows lateral movement of the swiveling thumbpad device and control post 232.

Another alternative embodiment may comprise a swiveling thumbpad platform which is connected to a base which is integral to a thumbstick. The thumbstick may have a vertical post which is connected to (or adapted to be connected to) a three-axis potentiometer, and a cap at the upper end of the post which serves as a base for the swiveling platform. In other words, the connector base is effectively combined with the cap of the thumbstick, rather than being a separate component which is clipped onto an existing thumbstick cap or mounted on a separate post of a three-axis potentiometer.

Figure 9A:
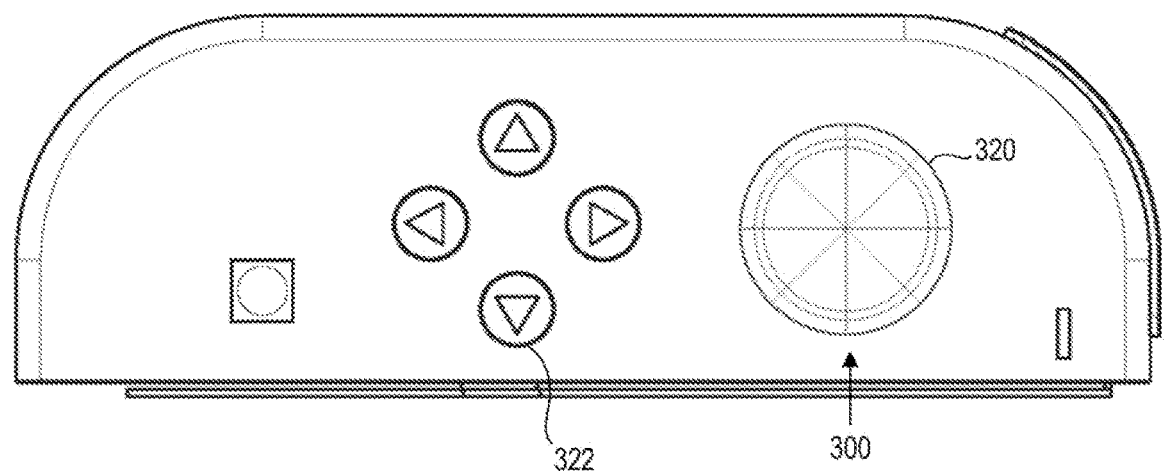
FIGS. 9A-9B are diagrams illustrating a clip-on swiveling thumbpad device mounted on an OEM thumbstick of a game controller in accordance with some embodiments.
Figure 9B:
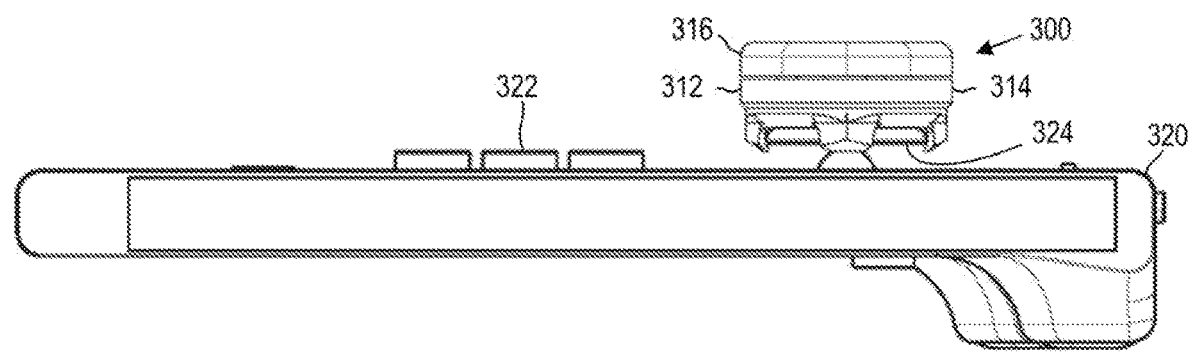

Referring to FIGS. 9A-9B a pair of diagrams illustrating a clip-on swiveling thumbpad device mounted on an OEM thumbstick of a game controller in accordance with one embodiment is shown. As depicted in these figures, a game controller 320 has a number of control input features, including buttons (e.g., 322) and a thumbstick 324. Swiveling thumbstick device 300 is mounted on an upper platform of OEM thumbstick 310. Swiveling thumbstick device 300 is secured to OEM thumbstick 324 by a set of clip-on legs (e.g., 312) that extends downward from the underside of the connector base 314 of the device. The clip-on legs secure the base to the OEM thumbstick. While force can be applied to the connector base to cause the connector base to rotate with respect to the platform of the OEM thumbstick, the connector base is not designed to rotate freely on the OEM thumbstick. The swiveling thumbpad portion 316 of device 300 is designed to rotate easily with respect to connector base 314 so that the user's thumb, when placed on top of swiveling thumbpad portion 316 can rotate and thereby accommodate the changing angular position of the thumb as the thumbstick is moved laterally. This is illustrated in FIGS. 10A-10B.

In each of FIGS. 10A-10B, a user's left hand is shown grasping the left side of game controller 320. The thumb is positioned on the cushioned pad of the clip-on swiveling thumbpad device 300. In FIG. 10A, the thumb is depicted pushing the thumbstick to the left, while in FIG. 10B, the thumb is pushing the thumbstick to the right. The swiveling thumbpad allows the joint at the base of the thumb to remain stationary as the thumb pivots from left to right (and right to left). In this case, the tip of the thumb can change its angular position on the thumbstick because the thumbpad is allowed to swivel. As a result, the intermediate joint of the thumb does not have to flex or rotate unnaturally, and the user experiences less discomfort and fatigue when using the swiveling thumbpad device.

Figure 11A:
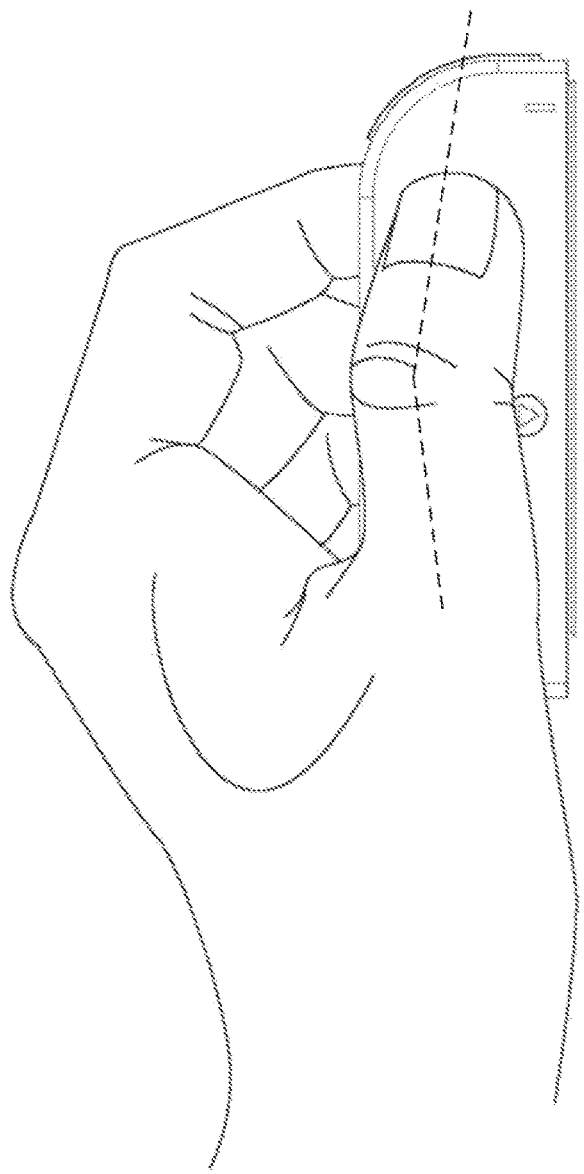
FIGS. 11A-11B are diagrams illustrating the movement of a user's thumb in the operation of a prior art controller device that does not have a swiveling thumbpad device.
Figure 11B:
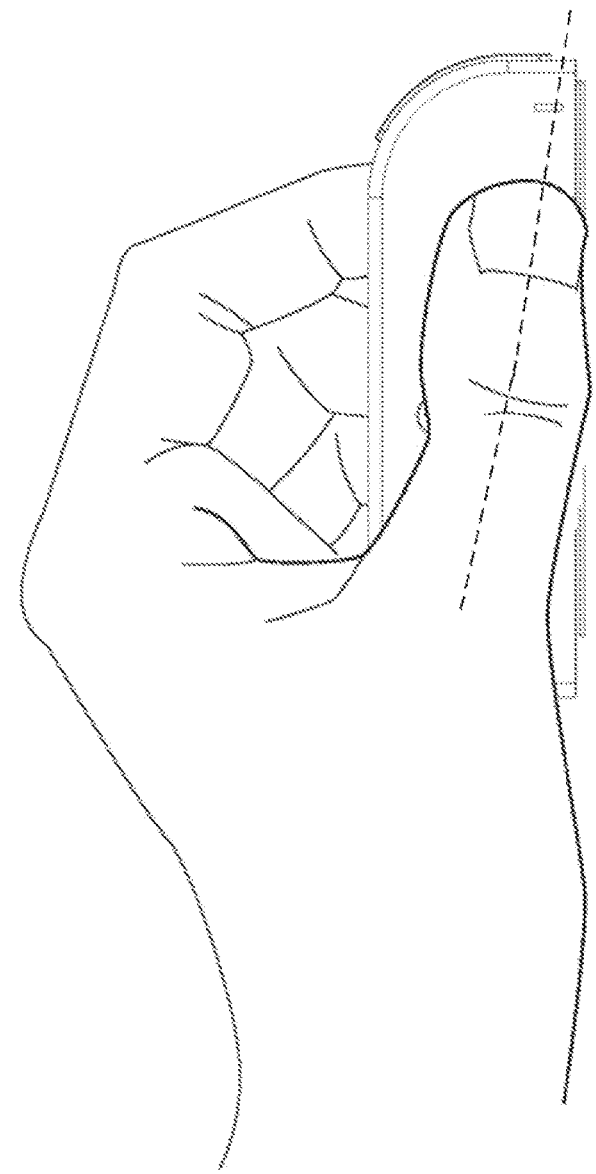

By contrast, when the thumbpad on top of the thumbstick is not allowed to swivel, the tip of the thumb must maintain the same angular position on the thumbstick (or, alternatively, the changing angular orientation of the thumb on the stationary thumbpad will cause rotational movement between the thumb and thumbpad leading to discomfort and/or user fatigue. This is illustrated in FIGS. 11A-11B. As shown in these figures, the stationary thumbpad causes the tip of the thumb to maintain the same angular orientation, even though the base of the thumb is pivoting. This causes flexing and/or rotation of the intermediate joint of the thumb. Although the flexing and/or rotation may be relatively small, the movement of the thumbstick is very repetitive, so the small amount of flexing and/or rotation can nevertheless cause substantial discomfort, fatigue, and potentially even pain in the thumb. By providing freedom of motion in the foam pad to swivel, substantial stress on the thumb is relieved.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An adapter for a thumbstick control input device comprising:

a connector base adapted to connect the adapter to an upper end of a pivoting thumbstick controller;

a platform which is connected to the connector base;

a cushioning pad connected to an upper portion of the platform, the cushioning pad comprising an elastomeric material adapted to cushion contact between a user's digit and the platform;

wherein an upper portion of the cushioning pad includes an upward facing thumbrest surface, the thumbrest surface having an outer ridge that forms a partial ring around a central depression with a notch disposed to one side to accommodate a user's thumb, the outer ridge being interrupted on the one side by a notch surface, the notch surface extending from the central depression to an outer periphery of the thumbrest surface, wherein a height of the notch surface is less than a height of the outer ridge;

wherein the platform comprises a swiveling platform which is adapted to freely rotate with respect to the connector base during operation of the thumbstick controller by a user's digit, wherein rotation of the swiveling platform relieves stress on the user's digit when the swiveling platform is moved laterally;

wherein the swiveling platform comprises a table which supports an elastomeric cushioning pad and a connecting post extending downward from the table, the connecting post extending into a receiving hole in the connector base, the connecting post adapted to rotate within the receiving hole; and wherein the connecting post comprises a split shaft having a lower end which includes one or more barbs extending radially outward from the split shaft, the split shaft adapted to flex and thereby enable the barbs to be inserted through the receiving hole in the connector base.

2. The adapter of claim 1, wherein the notch surface has an upward slope extending from the outer periphery of the thumbrest surface to an intermediate ridge and a downward slope extending from the intermediate ridge to the central depression, wherein a height of the intermediate ridge is greater than a height of the notch surface at the outer periphery of the thumbrest surface, greater than a height of the central depression, and less than a height of the outer ridge.

3. The adapter of claim 1, wherein the central depression includes an annular outer portion which is concave and a center portion which is convex and which is concentric with the annular outer portion.

4. The adapter of claim 1, wherein the swiveling platform is configured to rotate 360 degrees with respect to the connector base.

5. The adapter of claim 1, further comprising a recess at a lower end of the receiving hole, the recess adapted to receive the barbs, wherein when the split shaft is fully inserted into the receiving hole, the barbs are seated in the recess to retain the split shaft in the receiving hole.

6. The adapter of claim 1, wherein the connector base comprises a plurality of legs which extend downward from a body of the connector base, the legs adapted to removably clip the connector base onto a cap of an existing thumbstick.

7. The adapter of claim 6, wherein the connector base comprises a polycarbonate plastic, wherein the body is rigid and the legs are adapted to flex with respect to the body, enabling the legs to clip onto the cap of the existing thumbstick.

8. The adapter of claim 6, wherein each of the legs has a lower end which has a hooked tip which extends radially inward, the hooked tip extending underneath the cap of the existing thumbstick.

9. The adapter of claim 1, wherein the connector base comprises a recess adapted to receive an upward extending post of the thumbstick controller and to removably retain the connector base on the upward extending post.

10. A thumbstick control input device comprising:

a thumbstick controller comprising a pivoting thumbstick post;

a cap which is integral to an upper end of the thumbstick post, the cap providing a connector base for a platform, the platform connected to the connector base;

a cushioning pad connected to an upper portion of the platform, the cushioning pad comprising an elastomeric material adapted to cushion contact between a user's digit and the platform;

wherein an upper portion of the cushioning pad includes an upward facing thumbrest surface, the thumbrest surface having an outer ridge that forms a partial ring around a central depression with a notch disposed to one side to accommodate a user's thumb, the outer ridge being interrupted on the one side by a notch surface, the notch surface extending from the central depression to an outer periphery of the thumbrest surface, wherein a height of the notch surface is less than a height of the outer ridge;

wherein the platform comprises a swiveling platform adapted to freely rotate with respect to the connector base during operation of the thumbstick controller by a user's digit and to thereby relieve stress on the user's digit when the swiveling platform is moved laterally;

wherein the swiveling platform comprises a table which supports the cushioning pad and a connecting post extending downward from the table, the connecting post extending into a receiving hole in the connector base, the connecting post adapted to rotate within the receiving hole; and wherein the connecting post comprises a split shaft having a lower end which includes one or more barbs extending radially outward from the split shaft, the split shaft adapted to flex and thereby enable the barbs to be inserted through the receiving hole in the connector base, the receiving hole having a recess at a lower end of the receiving hole, the recess adapted to receive the barbs, wherein when the split shaft is fully inserted into the receiving hole, the barbs are seated in the recess to retain the split shaft in the receiving hole.

11. The thumbstick control input device of claim 10:

wherein the notch surface has an upward slope extending from the outer periphery of the thumbrest surface to an intermediate ridge and a downward slope extending from the intermediate ridge to the central depression;

wherein a height of the intermediate ridge is greater than a height of the notch surface at the outer periphery of the thumbrest surface, greater than a height of the central depression, and less than a height of the outer ridge;

wherein the central depression includes an annular outer portion which is concave and a center portion which is convex and which is concentric with the annular outer portion.

12. A control input device comprising:

a hand controller for a computer system, the hand controller including at least one thumbstick;

the thumbstick having a lower end pivotally connected to a three-axis potentiometer and an upper end adapted to be movable by contact with a user's thumb;

the upper end of the thumbstick having a thumbpad support and a cushioning pad connected to the thumbpad support, wherein an upper portion of the cushioning pad includes an upward facing thumbrest surface, the thumbrest surface having an outer ridge that forms a partial ring around a central depression with a notch disposed to one side to accommodate the user's thumb, the outer ridge being interrupted on the one side by a notch surface, the notch surface extending from the central depression to an outer periphery of the thumbrest surface, wherein a height of the notch surface is less than a height of the outer ridge;

wherein the thumbpad support comprises a connector base and a platform connected to the connector base;

wherein the platform comprises a swiveling platform adapted to freely rotate with respect to the connector base during operation of the thumbstick by a user's digit and to thereby relieve stress on the user's digit when the swiveling platform is moved laterally;

wherein the swiveling platform comprises a table which supports the cushioning pad and a connecting post extending downward from the table, the connecting post extending into a receiving hole in the connector base, the connecting post adapted to rotate within the receiving hole; and wherein the connecting post comprises a split shaft having a lower end which includes one or more barbs extending radially outward from the split shaft, the split shaft adapted to flex and thereby enable the barbs to be inserted through the receiving hole in the connector base, the receiving hole having a recess at a lower end of the receiving hole, the recess adapted to receive the barbs, wherein when the split shaft is fully inserted into the receiving hole, the barbs are seated in the recess to retain the split shaft in the receiving hole.

13. The control input device of claim 12:

wherein the notch surface has an upward slope extending from the outer periphery of the thumbrest surface to an intermediate ridge and a downward slope extending from the intermediate ridge to the central depression;

wherein a height of the intermediate ridge is greater than a height of the notch surface at the outer periphery of the thumbrest surface, greater than a height of the central depression, and less than a height of the outer ridge;

wherein the central depression includes an annular outer portion which is concave and a center portion which is convex and which is concentric with the annular outer portion.

14. The adapter of claim 1, wherein the notch is shaped to cradle the user's thumb to relieve pressure on the user's thumb where the user's thumb crosses the outer ridge.

15. The adapter of claim 1, wherein the notch is disposed between a first end and a second end of the outer ridge, wherein the notch surface has an arcuate portion extending from a location a first distance from a center of the central depression to a location a second distance from the center of the central depression, the arcuate portion forming an intermediate ridge, wherein the first distance is less than a distance of the outer ridge from the center of the central depression, wherein a height of the intermediate ridge is less than the height of the outer ridge.

16. An adapter for a thumbstick control input device comprising:

a connector base adapted to connect the adapter to an upper end of a pivoting thumbstick controller;

a platform which is connected to the connector base;

a cushioning pad connected to an upper portion of the platform, the cushioning pad comprising an elastomeric material adapted to cushion contact between a user's digit and the platform;

wherein an upper portion of the cushioning pad includes an upward facing thumbrest surface, the thumbrest surface having an outer ridge that forms a partial ring around a central depression with a notch disposed to one side to accommodate a user's thumb, the outer ridge being interrupted on the one side by a notch surface, the notch surface extending from the central depression to an outer periphery of the thumbrest surface, wherein a height of the notch surface is less than a height of the outer ridge; and wherein the notch is disposed between a first end and a second end of the outer ridge, wherein the notch surface has an arcuate portion extending from a location a first distance from a center of the central depression to a location a second distance from the center of the central depression, the arcuate portion forming an intermediate ridge, wherein the first distance is less than a distance of the outer ridge from the center of the central depression, wherein a height of the intermediate ridge is less than the height of the outer ridge.

\* \* \* \* \*